Figure 1:
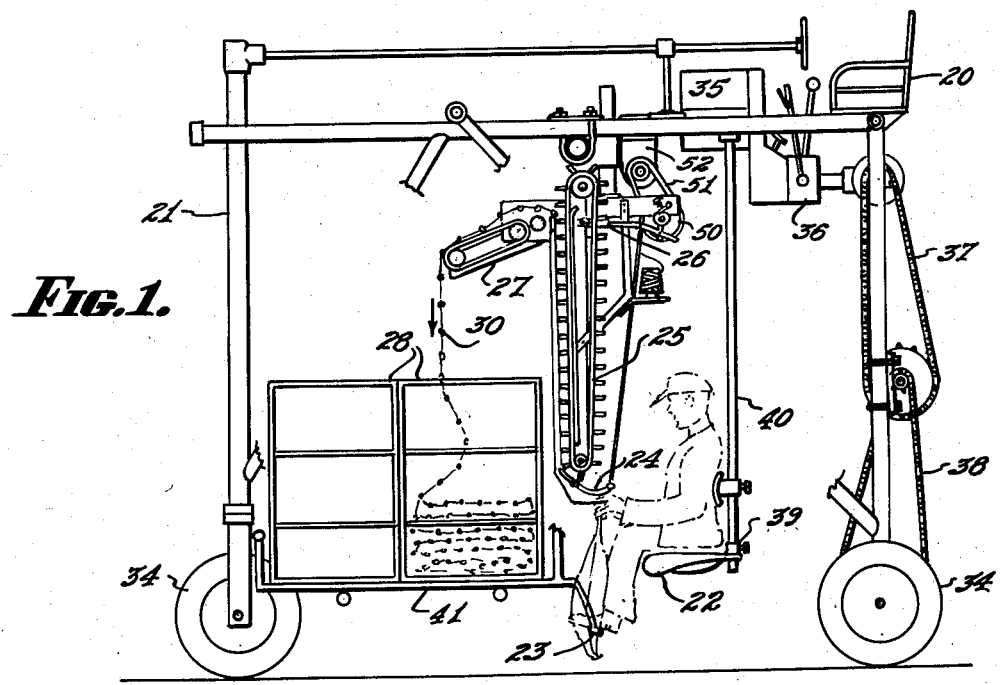

July 28, 1959   J. W. BELL, JR   2,896,797
APPARATUS FOR PROCESSING TOBACCO
Filed Jan. 19, 1955   3 Sheets-Sheet 1

INVENTOR.
JOHN W. BELL, JR.,
BY Allen + Allen
ATTORNEYS.

July 28, 1959     J. W. BELL, JR     2,896,797
APPARATUS FOR PROCESSING TOBACCO
Filed Jan. 19, 1955     3 Sheets-Sheet 2
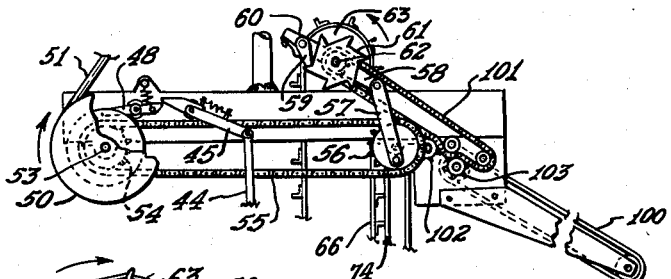
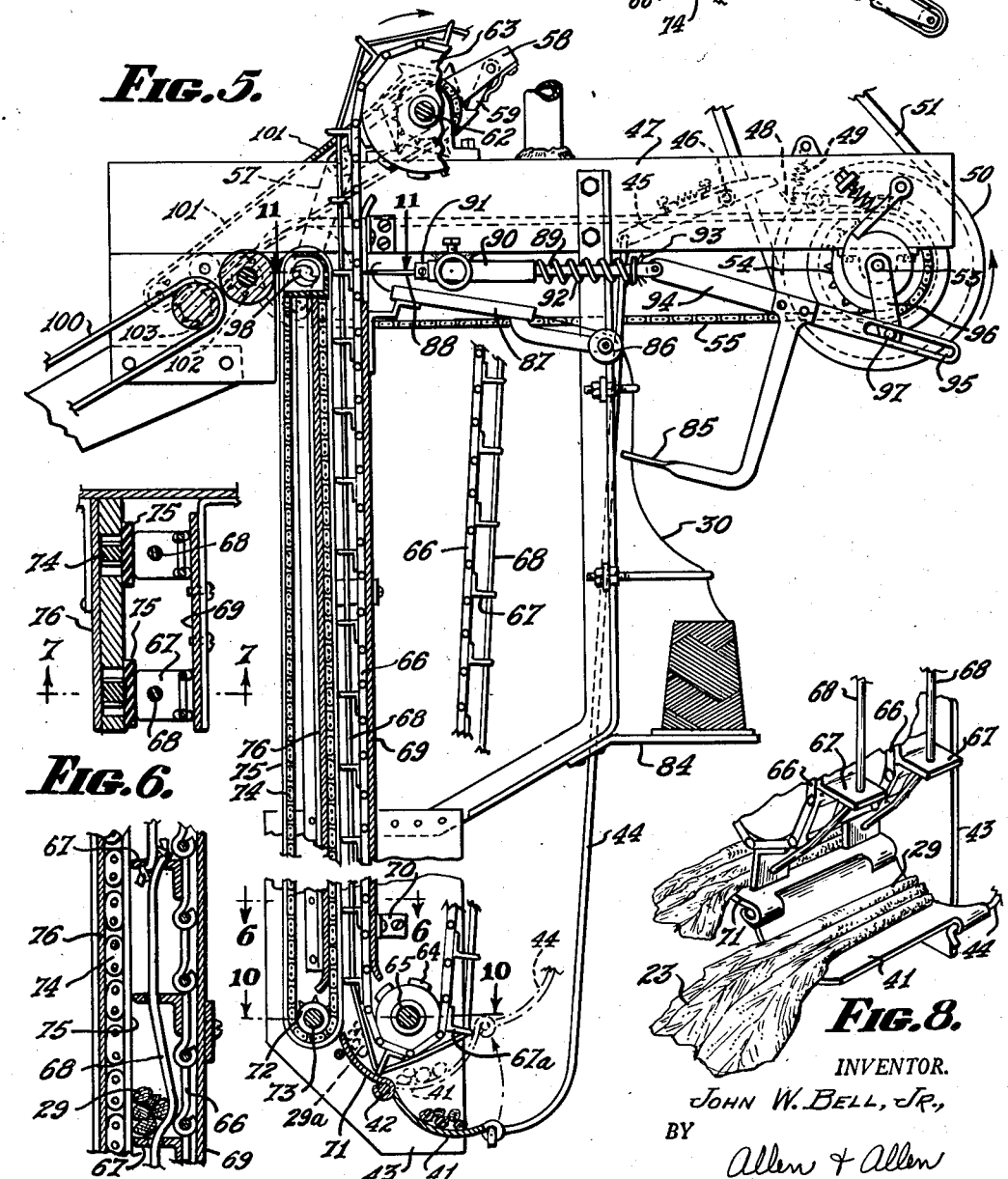
INVENTOR.
JOHN W. BELL, JR.,
BY
Allen & Allen
ATTORNEYS.

July 28, 1959 J. W. BELL, JR 2,896,797
APPARATUS FOR PROCESSING TOBACCO
Filed Jan. 19, 1955 3 Sheets-Sheet 3
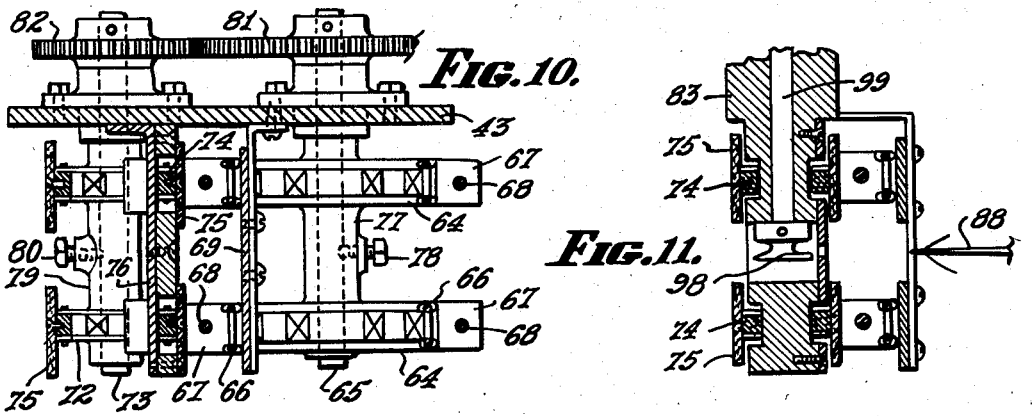
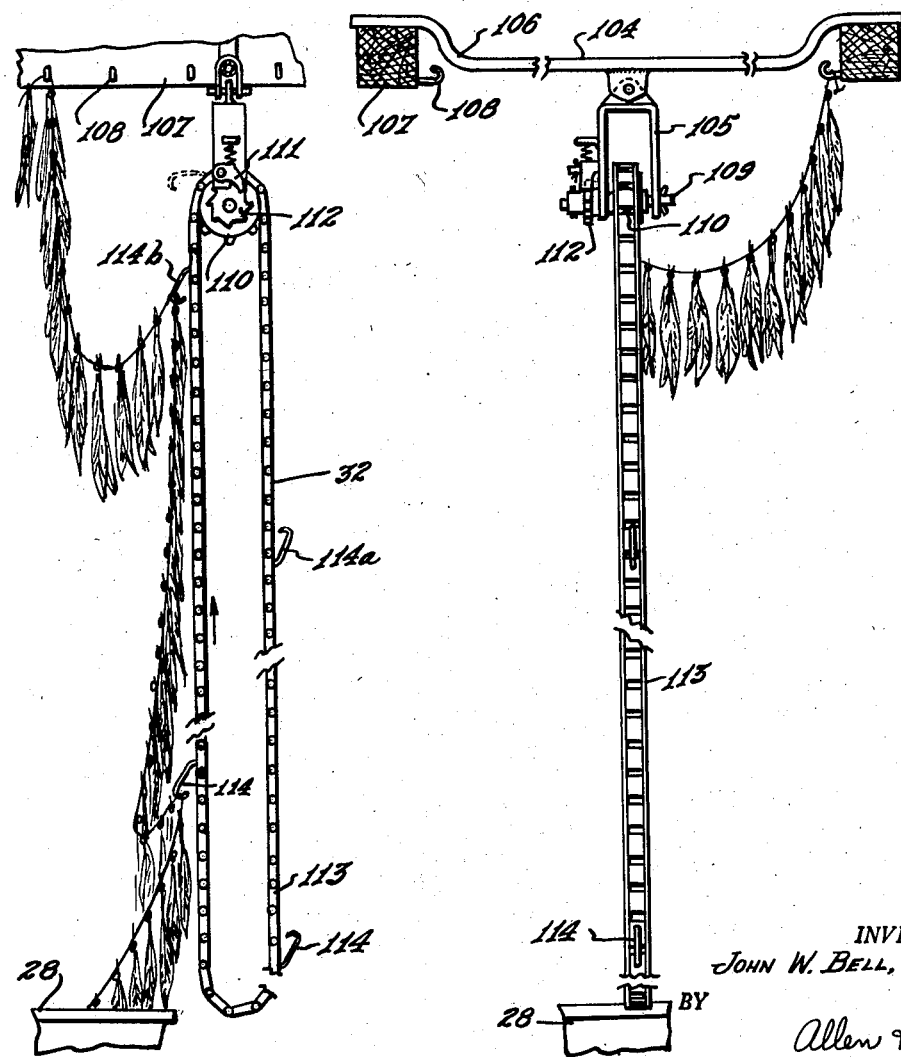
INVENTOR.
JOHN W. BELL, JR.,
BY
Allen + Allen
ATTORNEYS.

United States Patent Office 2,896,797
Patented July 28, 1959

2,896,797

APPARATUS FOR PROCESSING TOBACCO

John W. Bell, Jr., Paris, Ky.

Application January 19, 1955, Serial No. 482,908

11 Claims. (Cl. 214—5.5)

This invention relates to a method and apparatus for harvesting, handling and curing tobacco, the tobacco leaves being taken from the plant and moved from the field to the curing racks in the barn in what amounts to a continuous operation with a minimum of equipment and labor and with a maximum of efficiency, extreme care being taken of the tobacco leaves at all times.

As well known to those familiar with the art various methods of handling and processing tobacco are practiced throughout different sections or regions devoted to culture of this plant.

By one well known method it is the practice when harvesting tobacco to remove only the lower and earlier ripened leaves from the plant, thus leaving the stalk standing to permit the greener leaves eventually to ripen and mature whereafter they also are removed. The ripened leaves as thus removed are laid in piles which are thereafter collected and moved to a barn or work area wherein the leaves are strung or tied in small groups on a cord or thread usually associated with a stick. The sticks of leaves thus assembled are next lifted and transferred so as to hang between the poles or rafters of a barn, the leaves remaining there during the curing period.

The just described method of harvesting tobacco, wherein a few leaves at a time are removed from each stalk and wherein the leaves are hung in small bundles in a barn, is usually referred to as "priming" of tobacco. In general it may be said that my invention is directed to improvements in the practice of this method and to improved apparatus employed with it.

From the above description it is readily apparent that the "priming" of tobacco requires considerable time and labor, and that while this is a good process it is also an expensive process due to the several manual steps for operations required.

With the above considerations in mind it is an object of my invention to provide an improved method for the priming of tobacco whereby the required number of manual operations is substantially reduced with consequent reductions of time and cost in the handling of the tobacco and in getting it from the plant to the curing rack.

Another object of my invention is to provide an improved mechanism for use in the practice of my method, which mechanism comprises a portable machine adapted to be used in a tobacco field and serving to tie the leaves in small bundles interspaced upon a cord, immediately as the leaves are removed from the stalks, thus to produce a long string comprising many bundles of the leaves.

Yet another object of my invention is to provide means comprising a receptacle or basket removably carried in the machine, the receptacle being arranged to receive the long string of leaves as it is gradually formed, such receptacle when eventually filled being removable from the machine so as to be transported to a curing barn with its long string of leaves ready to be hung between the rafters of the barn.

A further object of the invention is to provide a simple, light and readily portable means comprising a hoisting device whereby the long strings of leaves contained within the aforementioned receptacles maintained at ground level may conveniently and expeditiously be hoisted from the containers to the rafters of the curing barn.

Figure 2:
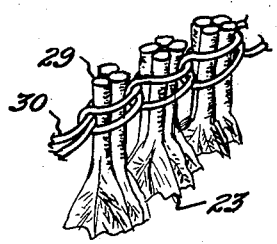

A very important object of my invention is to provide a method and apparatus for getting tobacco from the plant in the field to the rack in the barn with the utmost care being given to the individual tobacco leaves so that they are not bruised or otherwise damaged or spoiled. These and other objects and advantages of my invention will become apparent to those skilled in the art with an understanding of the ensuing description, reference now being made to the drawings, wherein like numerals are employed to designate like parts throughout and wherein Figure 1 is a small scale side elevational view of a tobacco harvesting or stringing machine constructed in accordance with the concepts of my invention, Figure 2 is a fragmentary perspective view showing a partial string of leaves tied to a chord, Figure 3 is a fragmentary perspective view showing a partial string of the leaves hanging between the rafters of a curing barn, Figure 4 is a series of views illustrating an old and well known looping device as employed in conjunction with my improved tying and stringing machine, Figure 5 is an enlarged vertical sectional view, taken through a preferred mechanism for tying small bundles of leaves onto a chord, Figure 6 is an enlarged horizontal sectional view taken along the line 6—6 of Figure 5, Figure 7 is a fragmentary vertical sectional view taken along the line 7—7 of Figure 6, Figure 8 is a fragmentary perspective view showing an arrangement for feeding and introducing the leaves into the tying mechanism, Figure 9 is a fragmentary view showing certain parts of the tying mechanism as seen from the opposite side of Figure 5, the view being on a reduced scale, Figure 10 is an enlarged horizontal section taken along the line 10—10 of Figure 5, Figure 11 is an enlarged horizontal section taken along the line 11—11 of Figure 5, Figure 12 is a side elevation showing a hoisting device constructed according to my invention, and Figure 13 is a view taken from the right side of Figure 12.

In general, an operator disposed at the station 20 drives the mechanism generally indicated at 21 through the field of tobacco. Another operator or operators positioned at the station 22 and carried by the machine will pick the desired leaves from the tobacco plants as the machine progresses. Groups of these leaves 23 will be placed on a member 24 where the stems thereof will be engaged by conveyor mechanism generally indicated at 25, all in Figure 1. Intermittent movement of the conveyor mechanism 25 will bring individual bundles of leaves before a looping mechanism generally indicated at 26 by which these bundles will be fastened to a continuous and suitable string. This string with the bundles of leaves looped thereto will be conveyed by mechanism 27 to a suitable receptacle 28 carried by the machine 21.

As will be explained presently in greater detail it will be understood that the stems 29 of the leaves 23 are engaged with the string 30 by the looping mechanism 26 in the manner indicated in Figure 2.

Figure 3:
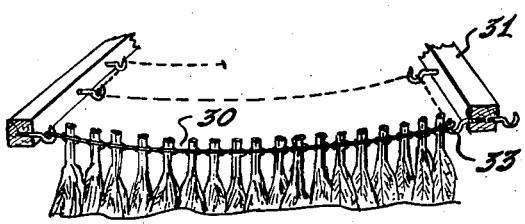
Figure 4:
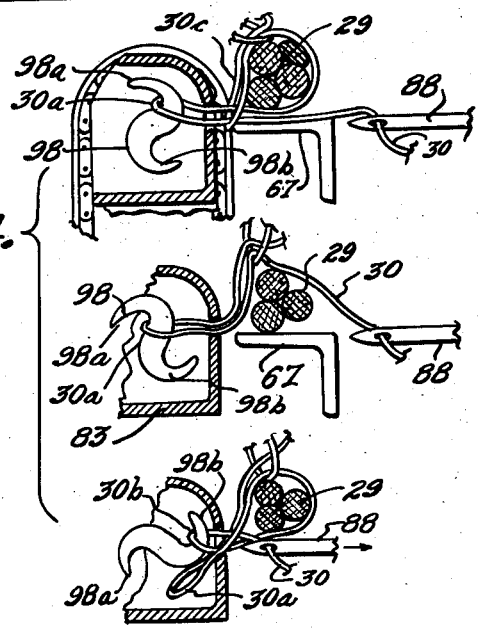

In order to get the relatively long strings of bunched and tied tobacco leaves disposed about the rafters 31, see Figure 3, of the curing barn it will be understood that filled containers 28 are taken to the barn and hoist mechanism generally indicated at 32 employed. An operator using the hoist mechanism 32 of Figure 12 can remove the strings of tied leaves from the receptacle 28 and move them toward the rafters 31. Another operator may take the string as so moved and loop it about hooks 33 on the rafters 31 in the manner generally shown in Figure 3. Thus the harvested tobacco leaves are picked and tied in the field and are strung in the curing barn without further operations having to be performed thereon.

The harvesting and stringing machine

The harvesting and stringing machine 21 of this invention comprises a framework supported on a plurality of wheels 34. Mounted in the framework is a motor 35. This motor, which will be used by the operator at station 20 to drive the machine in ordinary manner, is connected through gear shift mechanism 36 and chain transmissions 37 and 38 to the rear wheels 34. The station 22 is mounted in the frame as by the means 39 and 40. It will be understood that there may be a plurality of these stations 22.

It will also be apparent that the receptacle 28 is supported on suitable members 41 fastened to the framework. In similar manner the various mechanisms 25, 26 and 27 are supported from the frame of the machine 21.

It will be obvious to those skilled in the art that the machine is driven through the tobacco field and the desired leaves of tobacco stripped from the plants by the operator positioned at the station 22. These leaves are placed on the mechanism 24 and tied to the string 30 as will be described shortly.

The tobacco conveying mechanism

Referring now to Figure 5 it will be observed that the member 24 on which the tobacco is initially placed comprises a curved plate 41 which is pivoted at 42 to a plate 43 fixed in the framework of the machine. Normally the member 41 will be in the position shown in full lines in Figure 5.

The free end of the member 41 is connected to a long link 44 which in turn is fastened to one end of a lever 45 pivoted at 46 to a member 47 fixed in the frame of the machine 21. The other end of the lever 45 is arranged to engage one end of a lever 48 when the link 44 is moved upwardly as viewed in Figure 5. This lever 48 is also pivotally fastened to the member 47 and is spring biased as indicated at 49.

As perhaps best seen in Figures 1 and 5, there is a pulley 50 which is driven through a belt 51 by a motor 52. In normal operation the pulley 50 is driven continuously about the shaft 53 (see also Figure 9).

It will be understood that the lever 48 comprises a part of conventional mechanism whereby, when the lever 48 is engaged by the member 45, the pulley 50 is clutched to the shaft 53 and the shaft thereby driven from the motor 52.

Fixed to the shaft 53 is a sprocket 54 about which a chain 55 is disposed. This chain 55 also engages a sprocket 56 suitably mounted in the framework of the machine 21. A crank pin 57 is pivotally fastened to the sprocket 56 and is engaged to a member 58 which carries a ratch member 59 pivoted thereto as at 60. The ratch 61 is fixed to a shaft 62 which carries a pair of sprockets 63.

There are also two sprockets 64 fixed to a shaft 65 carried in the frame of the machine 21 as perhaps best seen in Figure 5. One chain 66 is engaged over a pair of sprockets 63 and 64 while another similar chain is engaged over the other pair of such sprockets.

Each of the chains 66 has a plurality of members 67 extending outwardly therefrom. Near the outer ends of the members 67 is a rubber cord or the like 68. As best seen in Figures 5 and 6, the chain 66 is backed by a plate 69 which is fastened in the framework of the machine as generally indicated at 70.

From the foregoing, it will be apparent that when an operator has placed the stems 29 of a desired number of leaves 23 on the member 41 and has then pushed the member 41 from the full line position of Figure 5 to the dotted line position of that figure, the link 44 will be moved upwardly. Such movement of the long link 44 actuates the clutch mechanism 48 through the lever 45 so that the pulley 50 is then momentarily engaged with the shaft 53. Since the pulley is driven by the motor 52, rotation of the shaft 53 will result. This, in turn, through sprocket 54 and chain 55, rotates the sprocket 56 thereby moving the crank pin 57 upwardly. Such movement of the crank pin engages the ratch 61 and rotates the sprockets 63 which are fixed on the same shaft 62 along with the member 61. Rotation of the sprockets 63 moves the chains 66 in the direction of the arrows of Figure 5. It will be understood that the arrangement of the figures is such that upon actuation of the clutch mechanism 48, the sprockets 63 will turn through one-sixth of a complete revolution. After this, the crank pin 57 will be descending and the sprockets 63 will not move until the link 44 has again been actuated in the manner described.

When the chains 66 are moved in the manner just described, the member 67a of Figure 5 will engage the stems 29 of the leaves and move them to the position 29a, as shown at the lowermost portion of Figure 5. These stems are now engaged between the rubber cords 68 and the plate member 71. Continued intermittent movement of the chains 66 will cause the individual bunches of leaves to move step by step upwardly through the machine as viewed in Figure 5.

Supplemental tobacco conveying mechanism

In order to insure handling of the tobacco leaves with a minimum of wear and tear, I have provided supplemental means to assist the chain arrangement 66 through 68 in moving the bunches of leaves step by step upwardly of the machine. To this end I provide a sprocket 72 fixed on a shaft 73 having a suitable bearing within the framework of the machine 21. This sprocket 72 is engaged by a chain 74 which is faced with rubber, as indicated at 75 in Figure 6. It will be observed that there are a pair of the sprockets 72 and a pair of the chains 74. The chain 74 is also backed by a plate 76 fixed in the frame of the machine in similar manner to the plate 69.

Referring now to Figure 10, it will be observed that the sprockets 64 are coupled together through a sleeve 77 which is fixed to the shaft 65 as indicated at 78. Similarly, the sprockets 72 are coupled together through a sleeve 79 fixed to the shaft 73 as indicated at 80. The shafts 65 and 73 are shown as having suitable bearings in the member 43, and it will be observed that the backing plates 69 and 76 for the chains 66 and 74 respectively are also fixed to this plate.

A gear 81 fixed to the shaft 65 drives a gear 82 fixed to the shaft 73. Obviously, rotation of the sprockets 63 in the manner above described will move the sprockets 64 and thereby the sprockets 72 through the gears 81 and 82.

The chains 74, in addition to passing around the sprockets 72, also slide over a member 83, see Figure 11, which is grooved to receive such chains. This member will be described in greater detail shortly.

From the foregoing, it will be apparent that when the stems of the leaves have been placed on the member 41 and the member 41 moved to the dotted line position of Figure 5, the chains 66 and 74 will be moved in unison through one step. This not only serves to move the stems from the initial position on the member 41 to a second position against the member 71, but it also moves bunches of leaves heretofore set into the machine through additional steps. Except for the first step of going from the member 41 to the member 71, at all other times the bunches are moved by the combined actions of the chains 66 and 74. To this end it will be observed that the stems 29 of the leaves 23 are engaged between the rubber cords 68 and the rubber facing 75 carried by the chains 66 and 74 respectively. Thus, after initial movement, further movement of the tobacco leaves is done positively and without sliding through the gripping action of the rubber faces 68 and 75. This insures handling of the leaves without unnecessary bruising of the leaves and their stems. The position of the stems 29 between the rubber cords 68 and rubber facing 75 is perhaps best seen in Figure 7. Another function of the rubber cords 68 is to keep the stems 29 in the bunched position in which the operator places them initially.

The looping device and tying means

Supported from a suitable shelf 84 fixed to the frame of the machine 21 is a spool of suitable string 30. This string passes from the spool through an opening in the arm 85 and between the discs of a tensioning device 86. The string passes from the tensioning device 86 through a tube 87 and through the eye of the needle 88. As also perhaps best seen in Figure 5, the needle 88 is fixed to a member 89 sliding within a bearing 90 which is fastened to the frame of the machine. A collar 91 fixed adjacent the needle 88 limits movement of the combined members 88 and 89. A spring 92 engages between one end of the bearing 90 and a member 93 fastened to the member 89.

The arm 85 is fixed to the member 94 which is slotted as at 95. A link 96 is fixed to the shaft 53 and has a pin 97 engaged within the slot 95. The arrangement of the link 96, pin 97, and slotted member 94 is such that upon the shaft 53 turning through the first one-half of a revolution, there will be no corresponding movement of the rod 89 and needle 88. Upon the shaft 53 reaching the half-way point, however, the arrangement among these parts is such that the rod 89 will be forced against the action of spring 92 with the result that the needle 88 is pushed between the rubber cords 68 carried by the conveyors 66 to form a loop, as will be described presently.

With respect to the shaft 53 as just mentioned, it will be remembered that the apparatus is so arranged that upon one complete revolution of the shaft 53, as will be obtained when the clutch mechanism 48 is actuated through the members 44 and 45, the upper sprockets 62 will first be moved through one-sixth of a revolution. After having so moved, these sprockets 62 will rest while the shaft 53 continues its complete revolution, the crank arm 57 then moving downwardly, as seen in Figure 9. It is during this continued movement of the shaft 53 that the needle 88 is actuated in the manner just described. Thus, we first have movement of the chains 66 and 74 to raise the bunched stems and then we have movement of the needle 88 and associated mechanism to form the desired loop.

Referring now to Figures 4 and 11, it will be observed that the loop forming member 98 is fixed to a shaft 99 rotatable within the housing 83. This shaft 99 is the one to which sprocket 56 is fastened. Sprocket 56 is driven with sprocket 54 through the chain 55 as earlier described. Thus, when the pulley 50 is clutched to the shaft 53, the sprocket 54 will make one complete turn, it being fixed to the shaft 53. In similar manner, the sprocket 56 and, therefore, the shaft 99 will also be turned through one complete revolution. This means that loop forming member 98 will be revolving during a part of the time that the needle 88 is stationary. It will also continue to revolve when such needle is actuated.

First, a group of the leaves, with their stems 29 pushed by the shelf members 67 mounted on the chains 66 and aided by the rubber facing 75 of the chains 74, are brought to the position shown in the sketch of Figure 4. During this time the string 30 and looper 98 will have moved from an initial position as shown in the top sketch of Figure 4 to this middle sketch. The loop 30a, from a previous cycle, wil be disposed about the point 98a.

Second, the chains 66 and 74 are stopped while the needle 88 moves to the position shown in the lower sketch of Figure 4. During this time the looper 98 moves from the position of the middle sketch to that of the lower sketch, the chains 66 and 74 remaining stationary. When this happens, the loop 30a is released from the point 98a and the point 98b picks up another portion of the string 30, thus starting the formation of a loop 30b. Because of the arrangement of parts as shown, the loop 30b will be within the loop 30a.

Third, as the loop forming member 98 continues to rotate, and as the needle returns to the position shown in the top sketch of Figure 4 under influence of spring 92, the chains 66 and 74 still remaining stationary, the loops will be disposed as shown in this sketch. By this time the continued formation of the loop 30b (which now is actually in the position of original loop 30a, original loop 30a being now at 30c) has resulted in tightening the loop 30a (30c) about the stems 29.

Another cycle of operation will result in the loop 30b slipping from the point 98b in the same manner as explained in connection with the loop 30a slipping from the point 98a. Obviously, these functions will be repeated upon each full turn of the shaft 99 as moved through the sprocket 56, chain 55, sprocket 54, shaft 53, pulley 50, clutch mechanism 48, and the link and levers 44 and 45, all as occasioned by the operator forcing the member 41 from the full position of Figure 5 to the dotted line position therein.

Means for guiding tied bundles to the receptacle

Although it is perhaps possible simply to let the string 30 with the bundles of leaves looped therein fall from the loop forming station to the receptacle 28, I prefer to provide additional mechanism whereby to reduce strain on the loop former 98. To this end, I provide a conveyor belt 100 on which the string 30 with bundles looped therein is initially placed following the loop forming operation. The belt 100 is arranged to move simultaneously with the chains 66 and 74 as follows. As perhaps best seen in Figures 5 and 9, there is a chain 101 which engages a sprocket fixed to the shaft 62 and which also engages additional sprockets 102 and 103 mounted on shafts fixed in the frame of the machine 21. Thus, it will be apparent that the same shaft 62, which drives the sprocket 63 and therefore the chains 66 and 74, also drives the belt 101.

By the arrangement just described, when a bundle of leaves has been looped, the chains 66 and 74 will, at the start of the next cycle of the operating mechanism, move the bundles one step. During this time the completed bundles are received on the belt 100 and moved along with actuation of chains 66 and 74. When the chains 66 and 74 are stopped, so also will be the belt 100. By frictional engagement between the tied bundles and the belt 100, there will be little drag on the string 30 as the next bundle is looped by actuation of the needle 88 and former 98 as above described.

The hoist mechanism

After the operator has gathered the tobacco leaves and has strung them as above explained, it then becomes necessary to remove the string of tobacco leaves from the receptacle 28 and to hang them in the curing barn. This involves arranging the string of leaves so that they will hang properly from the barn rafters or the like. In order that these long strings may be handled easily, I have found the device of Figures 12 and 13 to be quite helpful.

The hoist mechanism comprises a bar 104 to which is pivotally fastened a yoke member 105. The bar 104 is bent as at 106 so that it will sit properly on the rafters 107. The rafters carry a series of hooks 108 to receive the string of tobacco leaves.

The yoke member 105 carries a shaft 109 on which is mounted a sprocket 110. A spring biased ratch 111 and 112 is also provided to prevent reverse movement of the chain 113.

The chain 113 has a series of hooks 114 disposed thereon. The arrangement of these hooks is very important. As best seen in Figure 12, it will be observed that these hooks 114 are fastened to the chain 113 so that they normally take the position indicated for the hook 114a. Thus, it will be observed that such hook is so fixed to the chain that the free end thereof is turned upwardly and inwardly toward the chain.

The operator will pull a section of string from the receptacle 28 and loop it over one of the hooks 114. He will then pull the chain in the direction of the arrows in Figure 12, lifting the string of tobacco leaves a considerable amount. Another section of the string is then looped about another of the hooks 114 and the chain pulled a further amount, the ratchet mechanism preventing backlash. When the hook approaches the top of the mechanism, as at 114b, it will be observed that the free end carrying the string will be turned downwardly so that the string may be disengaged quite easily. Further movement of the chain will bring the hook 114b to the dotted line position of Figure 12. At this time a second operator on the rafter will have taken the string and looped it about one of the hooks 108 provided on the rafter. Because the hooks 114 are arranged in the manner just described in connection with hook 114b, it will be apparent that the string is automatically disengaged from the hooks as they reach the top of the device. This makes it quite easy for a pair of operators to get the string of leaves from the receptacle 28 to the rafters 107. Were it not for the arrangement of the hooks 114, it would be quite difficult to free the heavy string of leaves from the hooks as they approach the top of the mechanism.

*Review of general operation*

In operation, as my machine 21 is driven through the field of tobacco, the operators working from the position 22 will take the desired leaves from the tobacco plants. When a group of these leaves have been gathered, they are placed on the member 41 in the general manner shown in Figure 8. The operator then pushes the member 41 to the dotted line position of Figure 5.

Closing of the member 41 actuates the link and lever mechanism 44 and 45 to trip the clutch device 48. It will be understood that the motors 35 and 52 are now in operation. When the clutch 48 is actuated, the shaft 53 is driven by the belt and pulley from the motor 52. The arrangement of the clutch device is such that the shaft 53 will make one complete revolution. As this happens, the sprocket 56 is driven through the belt 55 which also engages the sprocket 54 fixed on the shaft 53.

Initial movement of the sprocket 56 serves to move the chain 66 a desired amount by means of the crank pin 57 and related mechanism, as shown in Figure 9. Simultaneous with this movement is movement of the chain 74 through the gears 81 and 82 shown in Figure 10. Also the belt 100 moves with the chains 66 and 74 through the arrangement of the chain 101 and related mechanism shown in Figures 5 and 9.

During the latter part of the revolution of sprocket 56, there will be no further movement of the chains 66 and 74 and of the belt 100. Thus, as the shaft 53 completes its rotation, the chains and belt just mentioned are stationary, while the needle 88 is driven through the mechanism 94 and related structure, as seen in Figure 5. It will be apparent that during initial movement of the shaft 53, the needle 88 was not actuated by reason of the pin 97 sliding in the slot 95.

Actuation of the needle 88 serves to form a loop about the stems 29 of the leaves 23 which are brought to a position before the needle through a succession of steps, each actuated by the clamping of the member 41. Formation of the loop is best seen in the three sketches of Figure 4. As above explained, the top sketch shows the initial position, the middle sketch shows the intermediate arrangement at which point the chains 66 and 74 are stopped and the needle 88 is started forward, and the lower sketch shows the needle about to return, the chains remaining stationary. Upon return of the needle to the position shown in the upper sketch of Figure 4, the loop will have been applied about the stems 29 in the desired manner.

As the string is continuously looped about individual bunches of leaves in step-by-step fashion as just described, the tied leaves are received on the belt 100. This belt moves in unison with the chains 66 and 74. During the rest period of these chains, the weight of the tied leaves will be in large part supported by the belt 100 rather than will such weight be applied directly to the looping mechanism and related structure as would otherwise be the case. As the leaves leave the belt 100, they are received in the receptacle 28.

Upon filling of the receptacle 28 with a continuous string of tied leaves, such receptacle is then ready to be taken to the barn so that the string 30 may be strung from the rafters 107. To this end the string is looped on the hooks 114 and by a succession of pulls of the chain 113, such string is brought to the rafter 107 where it may be placed on the hooks 108.

It will be apparent that when tobacco is handled according to my process and with the mechanisms herein shown and described, such tobacco is transferred from the field to the curing racks with a minimum of handling and in a more or less continuous operation. Elimination of unnecessary handling insures better quality tobacco.

It will be obvious to those skilled in the art that certain changes and modifications may be made in the apparatus employed without departing from the scope and spirit of my invention as applied to means and methods for the complete handling of tobacco. It will be understood that while I have shown my method as best carried out by the use of certain novel structures, I do not intend to be limited to such structures except insofar as they are specifically set forth in the subjoined claims.

Having thus described my invention, what I claim as new and what I desire to protect by United States Letters Patent is:

1. Apparatus for processing tobacco which includes a wheel supported frame and operator controlled motor means for driving same through a field of tobacco, a member mounted in said frame to receive the stems of a plurality of tobacco leaves as placed thereon by an operator, said member being movable from a receiving position to a clamping position, conveyor means supported by said frame to move leaves from said member in groups, means to drive said conveyor means, a looping station to which said conveyor means brings the groups of tobacco leaves, a supply source of string, needle means at said looping station to affix the stems of the groups of leaves to said string, means to actuate said needle means, and linkage between said member and said conveyor driving means whereby movement of said member to clamping position by an operator actuates said conveyor means.

2. Apparatus for processing tobacco which comprises a wheel supported frame and operator controlled motor means for driving same through a field of tobacco, a work shaft mounted in said frame, a pulley freely rotatable on said shaft, a motor to drive said pulley, clutch means to engage said pulley to said shaft, a first conveyor disposed about a pair of sprockets mounted on shafts journaled in said frame, a drive sprocket fixed on said work shaft, drive means between said drive sprocket and one of said pair of sprockets, a receiving member carried by said frame and adapted to receive the stems of a group of tobacco leaves placed thereon by an operator, and means on said first conveyor engaging leaves on said receiving member.

3. The apparatus of claim 2 in which said receiving member is movable from a receiving position to a clamping position, and linkage between said receiving member and said clutch means, movement of said receiving member from receiving position to clamping position actuating said clutch means through said linkage whereby to drive said first conveyor through said work shaft and said drive means.

4. The apparatus of claim 3 including revolution determining means connected with said clutch means whereby said work shaft makes one complete revolution upon each clamping movement of said receiving member.

5. The apparatus of claim 4 including lost motion means whereby said first conveyor is driven only during first movement of said work shaft.

6. The apparatus of claim 5 including a second conveyor, means to drive said second conveyor simultaneously with said first conveyor, and means on said second conveyor engaging leaves moved from said receiving member by said first conveyor.

7. The apparatus of claim 6 including a looping station to which leaves are brought by said conveyors, a supply source for string, a needle, a rotating loop forming member, and means driving said loop forming member and said needle from said work shaft, whereby the stems of a group of leaves are tied to said string by loops formed therein.

8. The apparatus of claim 7 in which the means for driving said loop forming member is connected to said work shaft so that said loop forming member and said work shaft make one complete revolution together, the means for driving said needle containing a lost motion arrangement whereby said needle is driven only during final rotation of said work shaft while said conveyors are idle.

9. The apparatus of claim 2 in which said first conveyor has plates mounted thereon, the means engaging said leaves comprising rubber cables carried by said plates.

10. The apparatus of claim 9 in which a backing plate is provided for said conveyor.

11. The apparatus of claim 6 in which said leaf engaging means on said second conveyor comprises a rubber facing fixed thereto.

References Cited in the file of this patent

UNITED STATES PATENTS

| | | |
|---|---|---|
| 413,393 | Farmer | Oct. 22, 1889 |
| 454,097 | Warren | June 16, 1891 |
| 1,492,864 | Straight | May 6, 1924 |
| 2,579,681 | Leitner | Dec. 25, 1951 |
| 2,704,158 | Long | Mar. 15, 1955 |
| 2,715,968 | Davis et al. | Aug. 23, 1955 |
| 2,717,702 | Wilson | Sept. 13, 1955 |

FOREIGN PATENTS

| | | |
|---|---|---|
| 681,280 | Great Britain | Oct. 22, 1952 |